United States Patent [19]
Culver, Jr.

[11] Patent Number: 5,044,303
[45] Date of Patent: Sep. 3, 1991

[54] SUB-SURFACE CONDUIT MARKING APPARATUS

[76] Inventor: Frank A. Culver, Jr., 6252 Mandarin Dr., Las Vegas, Nev. 89108

[21] Appl. No.: 425,304

[22] Filed: Oct. 23, 1989

[51] Int. Cl.⁵ .............................................. F16L 55/00
[52] U.S. Cl. ..................................... 116/209; 52/105; 405/157
[58] Field of Search ............... 24/16 PB; 52/103, 105; 116/200, 209, DIG. 14; 138/104; 248/231; 405/157

[56] References Cited

U.S. PATENT DOCUMENTS

| | | | |
|---|---|---|---|
| 966,086 | 8/1910 | Faile | 52/105 |
| 2,666,546 | 1/1954 | Reilly | 52/105 |
| 3,015,409 | 1/1962 | Campbell et al. | 220/3.4 |
| 3,069,538 | 12/1962 | Hobson | 248/231 |
| 3,115,861 | 12/1963 | Allen | 405/157 |
| 3,267,901 | 8/1966 | Carroll | 116/209 |
| 3,303,264 | 2/1967 | Saul et al. | 220/3.3 |
| 3,523,515 | 8/1970 | Brown | 116/209 |
| 3,533,243 | 10/1970 | Suydam | 61/72.1 |
| 3,568,626 | 3/1971 | Southworth, Jr. | 116/209 |
| 3,581,703 | 6/1971 | Hosack | 116/67 |
| 3,633,533 | 1/1972 | Allen et al. | 116/200 |
| 3,653,050 | 3/1972 | Eggleston, Jr. | 343/112 D |
| 3,747,355 | 7/1973 | Howard | 405/157 |
| 3,903,835 | 9/1975 | Carroll | 116/200 |
| 3,927,637 | 12/1975 | Sammaritano | 33/1 H |
| 4,457,095 | 7/1984 | Stevenson | 43/25.2 |
| 4,654,639 | 3/1987 | De Courville | 340/540 |
| 4,844,000 | 7/1989 | Clement | 116/205 |
| 4,915,055 | 4/1990 | Ptashinski | 116/209 |

Primary Examiner—William A. Cuchlinski, Jr.
Assistant Examiner—W. Morris Worth
Attorney, Agent, or Firm—Edward E. Roberts

[57] ABSTRACT

A conduit marking device including one or more strips of flexible material coupled adjacent one end to a fastening member configured for coupling to a conduit member. The strips, when coupled to the conduit member, extend in a vertical direction, with the strength and flexibility thereof being sufficient to avoid severing during the screeding process. The length of the strips is sufficient to extend above the surface of the poured concrete floor to provide visual indication of the location of the conduit member after curing of the concrete. The strips may be color coded, or may be provided with indicia, either or both of which may be used to indicate the type of conduit member, as well as the direction, depth or the like.

8 Claims, 2 Drawing Sheets

SUB-SURFACE CONDUIT MARKING APPARATUS

BACKGROUND OF THE INVENTION

The background of the invention will be discussed in two parts.

1. Field of the Invention

This invention relates to marking apparatus, and more particularly to apparatus for marking the location of conduits and the like embedded in concrete.

2. Description of the Prior Art

Locating subterranean or subsurface pipes, conduits, outlet boxes and the like has presented a major problem when repair or replacement is required. Attempts have been made to provide marking of some sort as a means for enabling ready detection of the location of the pipes or conduits.

Various attempts at marking and/or locating of subsurface or subterranean pipes or conduits exist in the prior art. One such apparatus is shown and described in U.S. Pat. No. 3,115,861, entitled "Locating Elements of Construction Beneath the Surface of Earth Soils", which issued on Dec. 31, 1963 to Allen, the apparatus therein including a frangible layer buried in the earth at a spaced vertical distance above the pipe, so that excavation thereafter will reveal the frangible layer prior to the pipe as layers of earth are removed.

Another such apparatus is shown and described in U.S. Pat. No. 3,523,515, entitled "Above Surface Observed Marker Secured to Underground Utilities, etc., to Indicate Their Depth and Direction", which issued to Brown on Aug. 11, 1970, such patent showing a marker device for underground electrical cable, wherein the marker is attached to the cable within the trench, and thereafter during backfilling, means such as cross bracing are provided for supporting the marker in a vertical position while the trench is being filled.

Another attempt at resolving the problem of underground elements is shown in U.S. Pat. No. 3,533,243, entitled "Method of Laying Underground Pipes, Conduits and the Like so as to Make Their Presence Easily Detectable", which patent issued Oct. 13, 1970, to Suydam, the method including placing a dye or other colored indicant on the walls of the trench prior to backfilling.

U.S. Pat. No. 3,568,626, entitled "Identifying Means for Buried Utilities", issued to Southworth, Jr., on Mar. 9, 1971, and relates to a marked frangible strip member configured for placing above the buried utility element, with the strip including magnetic or radioactive portions which can be sensed above ground prior to excavation.

A warning tape including capsules of smoke releasing pellets is shown and described in U.S. Pat. No. 3,581,703, entitled "Warning Tape for Underground Installations", which issued to Hosack on June 1, 1971, the tape being positioned above the utility member for fracture or rupture at a depth less than the depth of the utility member.

Another above surface detectable strip or tape member is shown and described in U.S. Pat. No. 3,633,533, entitled "Location of Underground Utility Lines", which issued to Allen on Jan. 11, 1972, the tape including position being sensed electronically.

A bore hole method of pipe detection is shown and described in U.S. Pat. No. 3,653,050, entitled "Pipe Locator Method and Apparatus", which patent issued to Eggleston Jr. on Mar. 28, 1972.

A method of supporting a pipeline is shown and described in U.S. Pat. No. 3,747,355, entitled "Pipeline Support by Beams and Cables in Permafrost Areas", such patent issuing to Howard on Mar. 3, 1972.

U.S. Pat. No. 3,927,637, entitled "Positive Sub-surface Utility Line and the Like Indicator", issued to Sammaritano on Dec. 23, 1975, and shows and describes an apparatus including a measuring tape attached at one end to the buried device, such as a pipe or cable, the tape measure upper end being received within a housing, which is further provided with a pole and flag extending above the surface to indicate its location.

U.S. Pat. No. 4,654,639, entitled "Signaling Material and Method for Protecting Subterranean Structures" issued to De Courville on Mar. 31, 1987, and shows a signaling material in the form of a continuous support of a material having a low resistance to rupture, the rupture of the material during excavation providing visual indication of a structure therebeneath.

In the pouring of concrete to cover very large areas, such as in industrial and commercial buildings, conduits, such as electrical or communications ducts, or pipes for plumbing and gas, are buried in the concrete. The conduits are laid out in the proper locations, usually on a supporting subsurface, for the desired runs. For usage such as electrical, computer, telephone communications, etc., it is usually necessary that the location of the conduits or ducts, including such accessories as floor duct openings, junction boxes, electrical outlet boxes, etc., be known or marked to provide access after the concrete is poured. Such boxes or equipment which provide access to the electrical or communications wiring are referred to as "stub-outs", that is, these are termination ducts with boxes with covers which can be removed for adding electrical outlets or telephone outlets at certain locations, In such concrete construction, the ducts may be round or rectangular in cross-section, and, in some manner, there must be a means for identifying the location of the access openings or stub-outs after the concrete has been poured. Such stub-outs are vertically disposed duct portions with upper open ends which are capped. During concrete pour, these capped ends are disposed some small distance below the surface of the finished floor and, after they are located, the thin layer of concrete covering is chipped away to provide access for removal of the cap and access to the electrical leads within the ducts.

One prior art method of marking the location of the stub-outs entails the use of threaded metallic members, such as screws, threadably affixed to some portion of the duct system, such as to flanges welded to the duct itself, or to covers attached to the openings of the boxes. The threaded members are unscrewed to a predetermined height above the duct or cover, generally to the intended elevation of the surface of the concrete floor.

One problem attendant to the use of these screw devices relates to the method of finishing the concrete floor. After the concrete is poured, or during the pour, an appropriate concrete finishing apparatus is utilized. One such apparatus is a gas motor powered "screed", which has a plurality of radially extending vanes or "trowel" members which rotate about a center axis. During screeding or finishing, these trowel members continually pass, in a circle, on the surface of the concrete. For any screw elevated too high, the result will be a bending or breakage of the screw, thus nullifying its intended purpose. On the other hand, if the screw lies below the concrete surface during finishing, its location thereafter will be hidden, thus requiring other means to find the screw, such as by use of a magnetic stud finder device or the like.

Accordingly, in accordance with an aspect of the invention, a feature is to provide a device and method for marking the location of conduits buried in concrete, which markers are relatively inexpensive and reliably located after finishing of the concrete.

SUMMARY OF THE INVENTION

The foregoing and other objects of the invention are accomplished by providing one or a plurality of strips of flexible material coupled adjacent one end to a fastening member configured for coupling to a conduit member. The strips, when coupled to the conduit, extend in a vertical direction, with the flexibility thereof being sufficient to avoid severing during the screeding process. The fastener member may be a flexible tie strip or may be a cap or plug member for engaging an end of a stub-out. The length of the strips is sufficient to extend above the surface of the poured concrete floor to provide visual indication of the location of the conduit after curing of the concrete. The strips may be color coded, or may be provided with indicia, either or both of which may be used to indicate the type of conduit, as well as the direction, depth or the like, Other objects, features and advantages will become apparent from a reading of the following specification, when taken in conjunction with the drawings, wherein like reference numerals refer to like elements in the several views.

DETAILED DESCRIPTION OF THE PREFERRED EMBODIMENT

Figure 1:
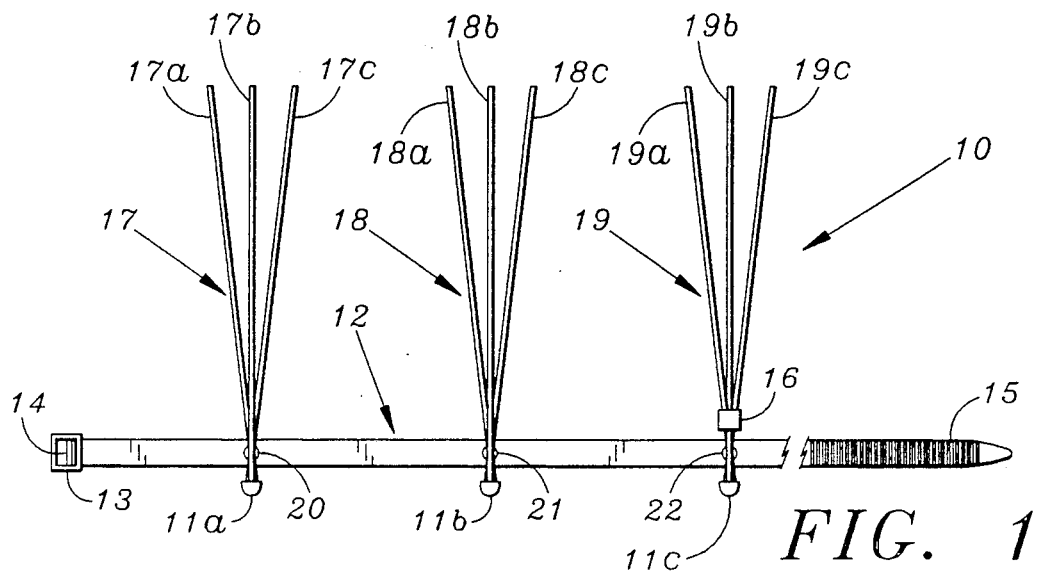
FIG. 1 is a front view of one embodiment of a conduit marker device in accordance with the invention.
Figure 2:
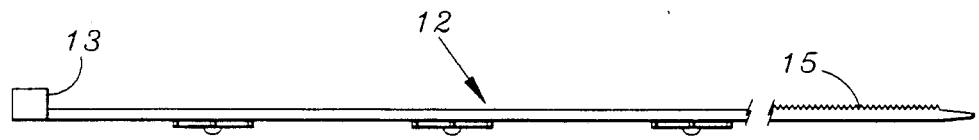
FIG. 2 is a top view of the marker device of FIG. 1.

Referring now to the drawings, and particularly to FIGS. 1 through 4, there is shown a conduit marker device, generally designated 10, which includes a fastener member 12 in the form of a flexible tie strip similar to the type commonly used in automotive applications. The fastener member 12 is formed of a plastic material and includes a first enlarged end 13 with a rectangular or slotted opening 14 of a dimension slightly larger than the cross-section of the member 12. The other end 15 includes a serrated surface portion, which serrated surface is configured for frictional engagement with an inwardly extending edge formed within the slot 14.

A plurality of marker means, such as other plastic strips are arranged in sets 17-19 (only three being shown), with each set 17-19 including a number of like feather strips which can be bonded at one end such as at common points 11a-11c, Each of the sets are further shown bonded to the fastener member 12, although as will be hereinafter described, this is not necessary. The bonding may be by means of adhesive, or by use of plastic welding techniques, or the strips and fastener member may be molded as a unit. As shown In FIG. 1, the set 17 includes three like flexible strips 17a, 17b, and 17c, preferably of plastic material. Toward the lower end thereof, the strips 17a-17c are joined at a common point 20 to the outer surface of the fastener member 12, with the free ends of the strips 17a-17c fanning out to resemble a feather, with the fanning out being in a direction generally perpendicular to the axial centerline of the fastener member 12.

Spaced as desired from the set 17 are sets 18 and 19, each having the strips 18a-18c and 19a-19c thereof which may be similarly bonded at the lower end thereof at common points 11b and 11c, respectively, and to the fastener member 12 at like common points 21 and 22, respectively. While the sets 17-19 are shown as having three strips, it is to be understood that any convenient number may be used, with the primary characteristic of each of the strips being to have flexibility and strength sufficient to withstand screeding, while having sufficient rigidity to maintain the proper attitude, that is, to maintain a direction toward the surface of the concrete as will be described.

Additionally, while the strips are shown joined at common points 20-22 to the fastener member 12, it is to be understood that slidable selective positioning on fastener member 12 can be made in "belt-loop" fashion by means of slip-tie 16 (FIG. 1), in which case there would be no bonding to fastener member 12 at point 22. Fastener member 12 would be slipped through at least two of the strips between common point 11c and slip-tie 16, with slip-tie 16 being then tightened down onto fastener member 12.

The strips which form the strip sets 17-19 have been described as plastic although other materials will readily suffice, such as spring steel, plastic coated spring steel, Teflon strips or even coil springs. The primary criteria which such strips must meet are flexibility and resilience sufficient to withstand a concrete pouring and finishing operation, while maintaining a generally erect attitude to show through the poured and finished concrete.

Figures 3, 4, 5:
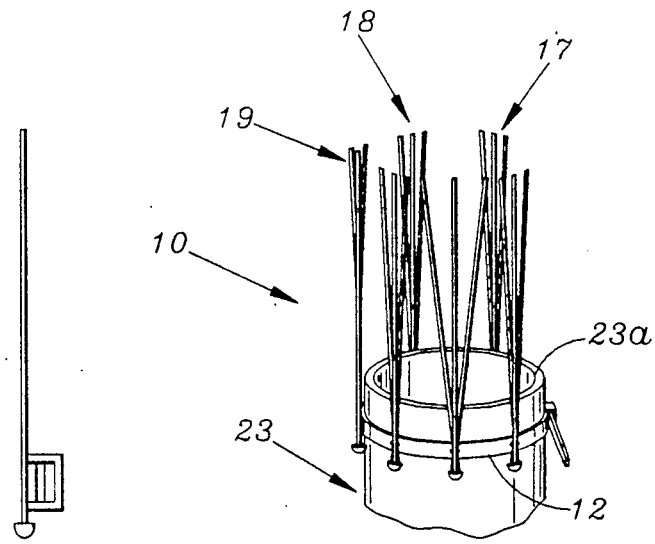
FIG. 3 is an end view of the marker device of FIG. 1.
FIG. 4 is a perspective view of the marker device of FIG. 1 assembled to a vertically extending conduit member.
FIG. 5 is a front view of an alternate embodiment of a conduit marker device in accordance with the invention.

In use, by reference to FIG. 4, a vertically extending tubular stub-out 23 is depicted, with the fastener member 12 secured adjacent the upper edge 23a thereof. The marker device 10 is shown as having five sets of feathers which extend in the vertical direction. The length of the feathers is determined by the depth of the pour of the concrete above the upper edge of the stub-out 23, which, in practical application may be a distance from less than one inch to about three inches. In any event, the vertically extending length of the sets 17-19 must be sufficient to extend above the poured concrete floor surface with the fastener member 12 attached adjacent the upper edge of the stub-out 23 as shown in FIG. 4.

FIG. 5 depicts an alternate conduit marker device 25 including one set 26 of feathers bonded or secured at one end thereof to the general midpoint of a patch or rectangular fastener member 27. The fastener member 27 is a flexible patch of suitable material to which the set 26 may be readily bonded, and, on the opposite surface thereof, is provided with a suitable adhesive for attachment to a surface of a conduit. The marker device 25 differs in some respects from the marker device 10, in that a sliding member 24 is provided about the set 26 of feather strips adjacent the bottom thereof near the fastener member 27.

The sliding member 24 is a block member with a slot therein, or may be a C-shaped cross-section configured for substantially surrounding the body of the set 26, and may be moved axially along the set. This effectively ties the part therebelow together to provide a greater degree of rigidity to the lower part of the set 26, should this additional rigidity be needed. Such a sliding member 24 may also be readily incorporated in the sets 17-19 of the marker device 10, or two such members 24 may be incorporated in the sets 17-19 to perform both functions of providing rigidity to the lower part of the set as well as provide the "belt-loop" fastening procedure as described hereinabove. Other means for providing the rigidity may be employed, such as simply banding the lower parts of the multiple feather strip sets together with wire or tape up to the desired height. Actual practice and use of the marker devices 10 and 25 will determine if such means are necessary.

Figure 6:
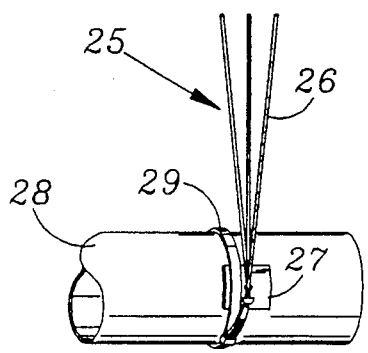
FIG. 6 is a perspective view of the alternate embodiment of the conduit marker device of FIG. 5 assembled to a horizontally extending conduit member.

As shown in FIG. 6, the fastener member 27 is affixed to a side surface of a horizontally extending conduit member 28, with the feathers of the set 26 extending in a direction generally perpendicular to the axial centerline thereof, that is, in a vertical direction as viewed in the drawings. In FIG. 6, the marker device 25 is shown attached to the circular sidewall of the conduit 28 by means of a plastic tie strip 29. The tie strip 29 may be utilized to assist in affixing the fastener member 27 of markers 25. While it is preferable to include an adhesive on the reverse surface of fastener member 27, adhesive is not necessary, and other adhesive may be manually applied to the reverse surface of member 27 and to the surface of the conduit 28 with the tie strip 29 holding the parts together while the adhesive dries.

Figure 7:
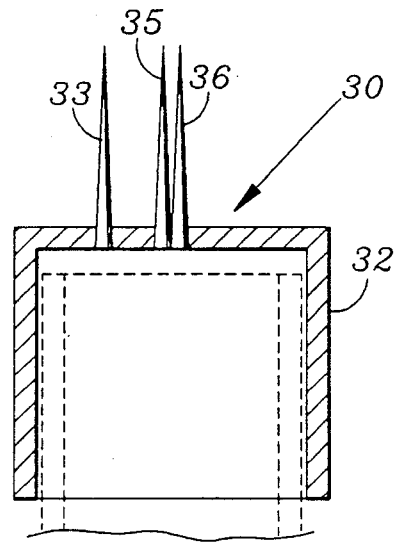
FIG. 7 is a cross-sectional view of an alternate embodiment of a conduit marker device in accordance with the invention, the fastener portion of the device being configured in the form of a cap for attachment to a vertically extending conduit member.

FIG. 7 depicts yet another embodiment for a conduit marker device 30, in which the fastener member 32 is formed as a cup-shaped cap configured for enclosing the upper end of a stub-out and/or coupling of circular cross-section. Secured to the top surface of the cap fastener 32, there are shown two sets of feathers, one including a single feather member 33 and the other including two feather members 35, 36. The two sets are shown for illustration and both sets need not be included in the same cap fastener member 32. The feather 33 is shown as a tapered member having the larger diameter end thereof secured to the upper surface of the cap fastener member 32, such as by passing through an opening and being bonded thereto.

The other feather strips 35, 36 are similarly affixed and arranged with the enlarged bottom ends adjacent one another. The positioning of a single strip 33, or multiple feather strips 35, 36 is one of choice, and may be placed anywhere on the fastener cap member 32, so long as the axes thereof are in a line parallel to the axial centerline of the fastener cap member 32.

Figure 8:
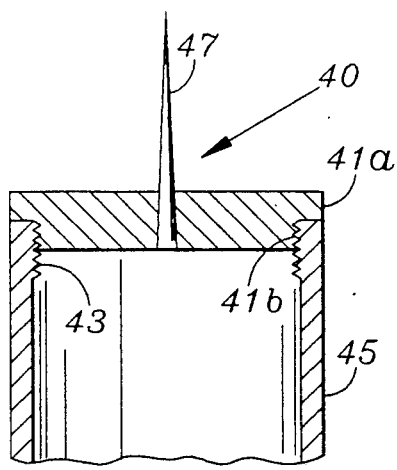
FIG. 8 is a cross-sectional view of yet another embodiment of a conduit marker device in accordance with the invention, the fastener portion of the device being configured in the form of a threaded plug member for attachment to a vertically extending conduit member.
Figure 9:
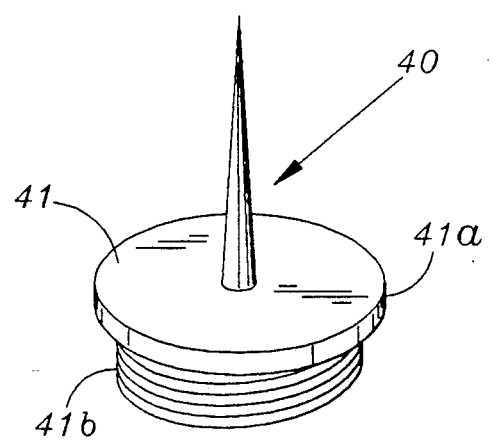
FIG. 9 is a perspective view of the conduit marker device of FIG. 8.

As shown in FIGS. 8 and 9, another conduit marker device 40 is illustrated, in which the fastener member 41 is a cap member having an enlarged flange portion 41a and a reduced diameter portion 41b with a threaded periphery for engaging an internally threaded opening 43 of a stub-out 45. A single tapered feather strip member 47 is located at the center of the flange portion 41a and extends on the axial centerline thereof in a direction perpendicular to the surface thereof. The material from which the fastener cap member 41 is formed and the material from which the feather strip 47 is formed will determine the method of affixation of the components. In a particular configuration, both the members 41 and 47 may be made of plastic and plastic adhesive or plastic welding may be employed to join the parts, Alternatively, the fastener member 32 (FIG. 7) could be a flat cover for topping off the upper end of the stub-out, and could be of a plyable material such as neoprene or styrofoam to facilitate break out of the concrete covering the stub-out, Likewise, the fastener member 40 (FIGS. 8 and 9) could be comprised only of a neoprene or styrofoam portion 41b threaded to engage threaded opening 43.

In accordance with the invention, the feather strips may be rectangular or circular in cross-section, or even tapered, and may be singly or multiply arranged, and may be positioned and arranged in any desired configuration on the fastener member, so long as the feather strips are sufficient in length to protrude above the poured and finished concrete surface, and so long as the feather strips have sufficient resilience, rigidity and flexibility to maintain the vertical attitude during finishing.

The fastener members may take any desired shape and configuration, and may be marked to indicate depth or direction, and may be color coded to indicate type of buried utility conduit, By use of multiple feather strip arrangements in sets, there is an added advantage of guarding against the possibility of breakage of one, thereby providing a high probability of at least one of the set remaining intact and protruding through the poured concrete surface.

While there have been shown and described preferred embodiments, it is to be understood that various other adaptations and modifications may be made within the spirit and scope of the invention.

What is claimed is:

1. A device for marking the location of conduit at or below the surface of a poured concrete floor, said device comprising:
    means for fastening the device to a portion of a conduit;
    generally flexible feather means for indicating the conduit location relative to the surface of said floor, said feather means being secured at approximate one end thereof to said fastening means, said feather means having a rigidity sufficient to withstand concrete finishing methods and having a length sufficient for a second end thereof to protrude, at least in part, above the surface of the concrete floor after finishing thereof;
    said feather means having adjustable means for slideable positioning and securing of selected ones of said feather means onto said fastening means.

2. The device according to claim 1 wherein said selected ones of said feather means includes at least one set of a plurality of generally identical feather strip members all of which are secured to each other at said one end thereof to a common point; and said adjustable means including means for banding selected ones of said set of strip members together at a point intermediate said common point and a second end of said feather strip members.

3. The device according to claim 2 wherein said adjustable means is a slip tie banding certain of said strip members in belt loop fashion whereby said fastening means may be slipped through at least two of said strip members between said common point and said slip tie.

4. The device according to claim 2 wherein the strip members of said at least one set are oriented generally in the same direction fanning out toward said second end of said strip members, and selectively color coded to indicate the type of conduit.

5. THe device according to claim 4 wherein said banding means includes a slideable member configured for generally frictionally encompassing the set of said strip members.

6. A device for marking the location of conduit at or below the surface of a poured concrete floor, said device comprising:

strip means for fastening the device to a portion of a conduit;

a plurality of sets of generally flexible generally identical feather strip members all of which are secured at one end thereof to said strip means, said strip members having a rigidity sufficient to withstand concrete finishing methods and having a length sufficient for a second end thereof to protrude, at least in part, above the surface of the concrete floor after finishing thereof; and means for banding said set of strip members together at a point intermediate said strip means and said second end of said strip members for enhancing the rigidity of said set of strip members.

7. The device according to claim 6 wherein said strip members of each set are secured to each other at said one end thereof to a common point on said strip means.

8. The device according to claim 6 wherein the strip members of all sets are oriented generally in the same direction and said strip members are selectively color coded to indicate the type of conduit.

* * * * *